(12) United States Patent  (10) Patent No.: US 8,458,286 B2
Freitas et al.  (45) Date of Patent: Jun. 4, 2013

(54) FLEXIBLE WIRELESS ADVERTISEMENT INTEGRATION IN WIRELESS SOFTWARE APPLICATIONS

(75) Inventors: Nathanial X. Freitas, Brooklyn, NY (US); Shane Conneely, Hoboken, NJ (US); Will Meyer, New York, NY (US); Jonathan Oakes, New York, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2103 days.

(21) Appl. No.: 09/794,082

(22) Filed: Feb. 28, 2001

(65) Prior Publication Data

US 2001/0047272 A1  Nov. 29, 2001

Related U.S. Application Data

(60) Provisional application No. 60/185,749, filed on Feb. 29, 2000.

(51) Int. Cl.
  *G06F 15/173* (2006.01)

(52) U.S. Cl.
  USPC .......................................................... 709/217

(58) Field of Classification Search
  USPC .............. 709/217, 212, 213, 203, 201; 705/1; 455/403, 39, 73
  See application file for complete search history.

(56) References Cited

U.S. PATENT DOCUMENTS

| | | | |
|---|---|---|---|
| 4,779,081 A * | 10/1988 | Nakayama et al. | 715/790 |
| 4,788,675 A | 11/1988 | Jones et al. | |
| 5,134,719 A | 7/1992 | Mankovitz | |
| 5,303,393 A | 4/1994 | Noreen et al. | |
| 6,000,000 A * | 12/1999 | Hawkins et al. | 707/201 |
| 6,108,727 A * | 8/2000 | Boals et al. | 710/68 |
| 6,141,010 A * | 10/2000 | Hoyle | 715/854 |
| 6,253,326 B1 | 6/2001 | Lincke et al. | |
| 6,259,405 B1 * | 7/2001 | Stewart et al. | 342/457 |
| 6,300,946 B1 | 10/2001 | Lincke et al. | |
| 6,343,318 B1 | 1/2002 | Hawkins et al. | |
| 6,360,272 B1 | 3/2002 | Lincke et al. | |
| 6,397,246 B1 * | 5/2002 | Wolfe | 709/217 |
| 6,397,259 B1 | 5/2002 | Lincke et al. | |
| 6,425,087 B1 | 7/2002 | Osborn et al. | |
| 6,430,603 B2 * | 8/2002 | Hunter | 709/207 |
| 6,453,371 B1 | 9/2002 | Hampson et al. | |
| 6,457,134 B1 | 9/2002 | Lemke et al. | |
| 6,493,327 B1 * | 12/2002 | Fingerhut | 370/328 |
| 6,523,124 B1 | 2/2003 | Lunsford et al. | |
| 6,560,640 B2 * | 5/2003 | Smethers | 709/219 |
| 6,581,025 B2 * | 6/2003 | Lehman | 702/178 |
| 6,590,588 B2 | 7/2003 | Lincke et al. | |
| 6,591,288 B1 * | 7/2003 | Edwards et al. | 709/203 |
| 6,628,928 B1 * | 9/2003 | Crosby et al. | 455/77 |

(Continued)

FOREIGN PATENT DOCUMENTS

WO  WO 99 55066  10/1999

OTHER PUBLICATIONS

U.S. Appl. No. 11/449,001, Creemer.
U.S. Appl. No. 11/901,272, Kansal et al.

(Continued)

*Primary Examiner* — David Eng

(57) ABSTRACT

An advertising architecture is provided that allows advertisements to be tailored for different wireless device types and minimizes transmitted information while maintaining the functionality of Banner Ads.

15 Claims, 5 Drawing Sheets

U.S. PATENT DOCUMENTS

| | | |
|---|---|---|
| 6,675,165 B1 * | 1/2004 | Rothschild ................ 707/10 |
| 6,675,202 B1 * | 1/2004 | Perttunen ................ 709/217 |
| 6,675,204 B2 * | 1/2004 | De Boor et al. ............ 709/217 |
| 6,694,428 B2 | 2/2004 | Lemke et al. |
| 6,701,521 B1 | 3/2004 | McLlroy et al. |
| 6,795,710 B1 | 9/2004 | Creemer |
| 6,816,725 B1 | 11/2004 | Lemke et al. |
| 6,829,560 B2 * | 12/2004 | Lehman ................ 702/178 |
| 6,880,048 B1 | 4/2005 | Lemke |
| 6,961,567 B1 | 11/2005 | Kuhn |
| 7,024,464 B1 | 4/2006 | Lusher et al. |
| 7,103,370 B1 | 9/2006 | Creemer |
| 7,266,379 B2 | 9/2007 | Blight et al. |
| 2001/0044310 A1 | 11/2001 | Lincke |
| 2001/0047272 A1 | 11/2001 | Freitas et al. |
| 2003/0050046 A1 | 3/2003 | Conneely et al. |
| 2006/0030306 A1 | 2/2006 | Kuhn |
| 2007/0178899 A1 | 8/2007 | Kuhn |

OTHER PUBLICATIONS

U.S. Appl. No. 60/954,022, Swift et al.

\* cited by examiner

FLEXIBLE WIRELESS ADVERTISEMENT INTEGRATION IN WIRELESS SOFTWARE APPLICATIONS

PRIORITY

The following application claims priority from U.S. Provisional Patent Application Ser. No. 60/185,749, filed Feb. 29, 2000, the disclosure of which is incorporated herein by reference.

FIELD OF THE INVENTION

The present invention relates to wireless software applications. More particularly, the present invention relates to advertising applications for use in wireless software applications.

BACKGROUND OF THE INVENTION

The World Wide Web has proven that online advertisement can provide a viable source of revenue for electronic application and content providers. The most common form this advertisement takes is what is commonly known as a Banner Ad. A banner ad is a component of a web page that is typically made up of a multimedia component that conveys information about the product or service being advertised, as well as a hyperlink to more information or a web site where the product or service can be purchased.

Moving Banner Ads into the wireless or mobile device realm has proven to be challenging for a number of reasons. One such reason is that wireless and mobile devices typically have constrained, limited, and heterogeneous device display capabilities. The bandwidth available for transmission over different wireless networks also places different constraints on the media that can be transmitted to the wireless devices. Thus, the same Banner Ad would not be appropriate for all wireless devices.

In addition, wireless devices typically have more limited interaction mechanisms and thus it may not be possible to navigate a Banner Ad in the same way on all devices. Furthermore, the higher cost of wireless bandwidth requires a focus on minimizing the data required for the Banner Ad in order to reduce the transmission time and the consequent cost.

A need therefore exists for an advertising architecture that allows advertisements to be tailored for different wireless device types and minimizes transmitted information while maintaining the functionality of Banner Ads.

SUMMARY OF THE INVENTION

The present invention satisfies the foregoing needs by providing, in one aspect, an advertising architecture which includes a wireless data reception and display device. A memory cache is provided in the wireless data device to store data relating to advertisements to be displayed on the wireless data device.

In another aspect, a method of delivering advertisement content to a wireless device is provided wherein a data file including data representative of an advertisement and usage rules is generated. The data file is stored in memory on the wireless device and the advertisement is displayed on the wireless device in accordance with the rules for displaying the advertisement.

In yet another aspect of the invention, a method of managing advertising content in a wireless environment is provided wherein a transmission is received from a wireless device at a wireless server. Information about the wireless device is determined from the transmission and a data file to be transmitted to the wireless device is selected based upon the information determined about the wireless device. The data file is then transmitted to the wireless device. The data file includes data representative of an advertisement and rules for displaying said advertisement.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

Figure 1:
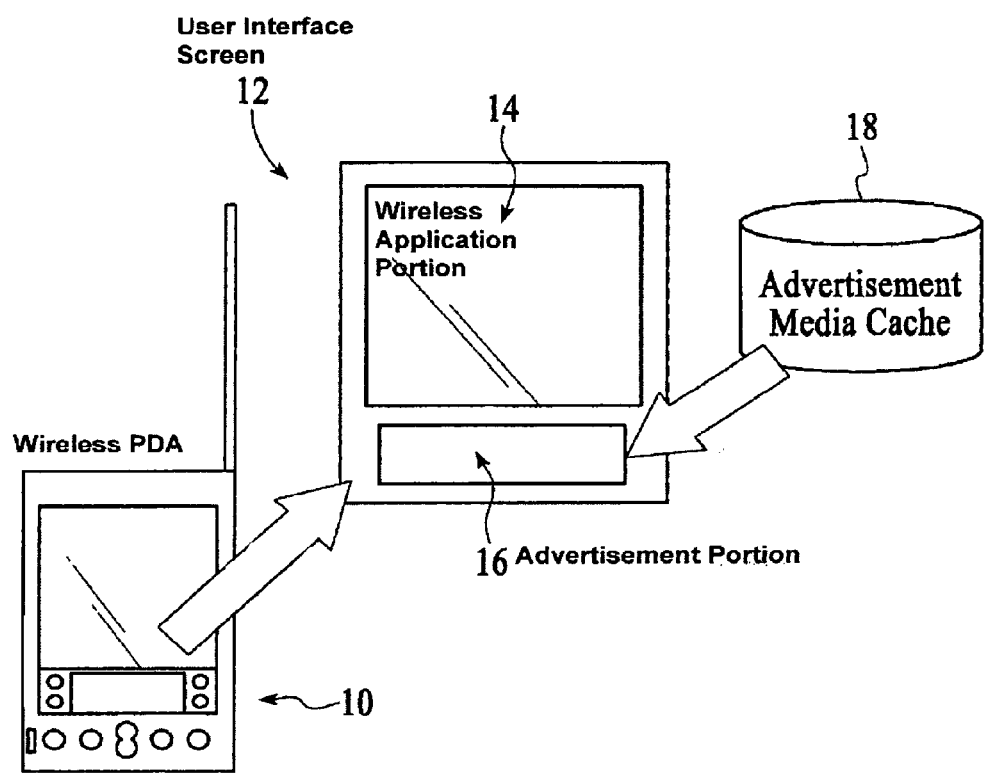
FIG. 1 is an illustration of a wireless PDA, the display screen with a banner advertisement, and an advertising data cache of a preferred embodiment of the present invention.

Referring now to the figures wherein like reference numerals indicate like elements, in FIG. 1 there is illustrated a wireless personal digital assistant (PDA) device with the user interface screen 12 expanded for clarity. Also depicted is a memory cache of the PDA 18 for storing advertising media and display rules for advertisements to be displayed on the PDA user interface screen 12. While discussed herein in the context of a wireless PDA, it should be understood that the advertising architecture to be described herein would be equally applicable on any wireless web access device.

The user interface screen is divided into two sections, the first being the wireless application portion 14 for retrieving both data and actions from a wireless server. The second portion of the user interface screen is the Banner Advertisement portion 16. The location and timing of the display of an advertisement on the PDA is determined by meta-information stored along with the advertising media as part of a data file (Advert Bundle) in a data cache 18 within the PDA device. A detailed discussion of the contents of the Advert Bundle will be provided below.

Figure 2:
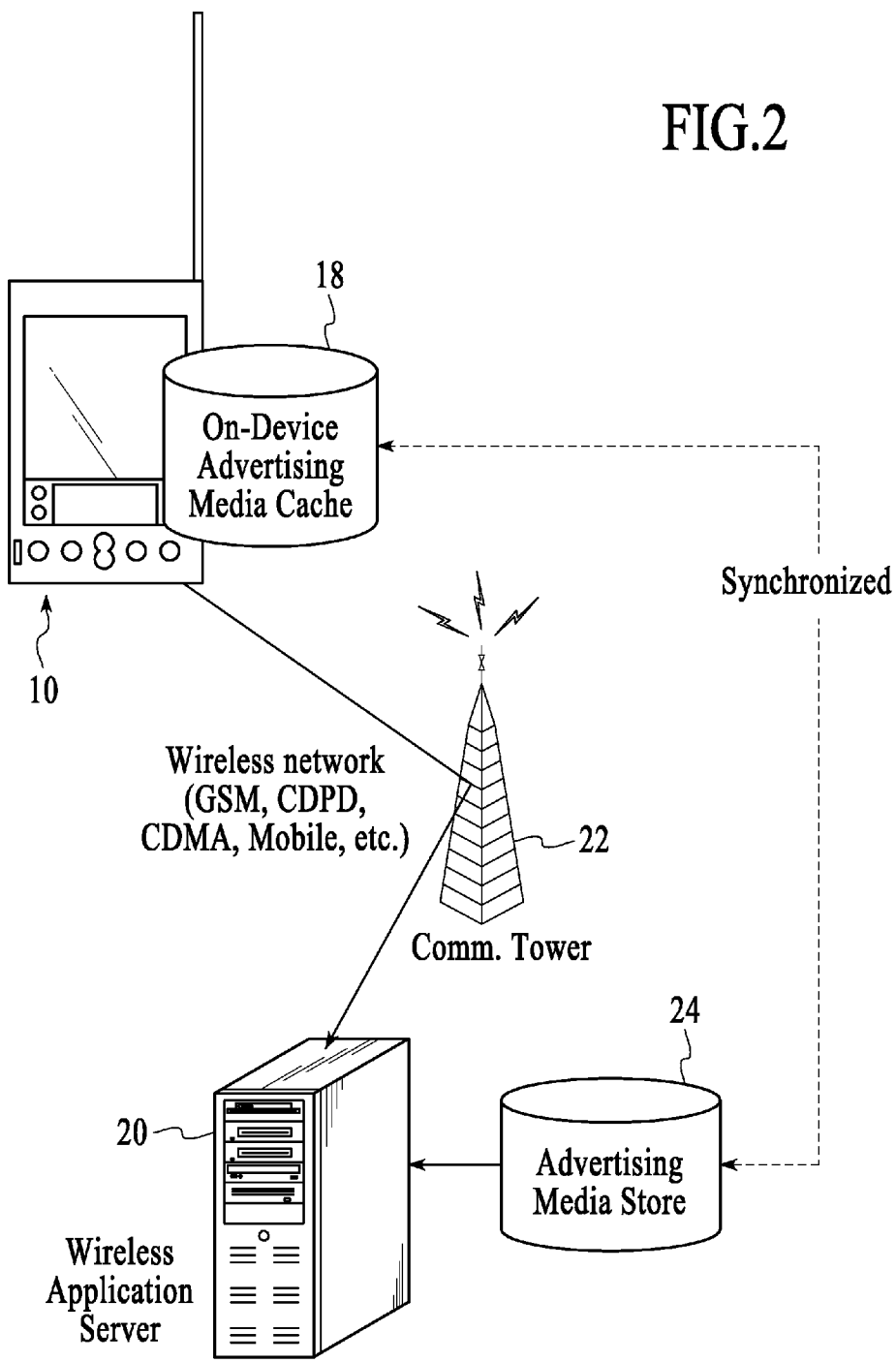
FIG. 2 is an illustration of a wireless PDA system in accordance with a preferred embodiment of the present invention.

As shown in FIG. 2, a wireless PDA system supporting the advertising architecture of the present invention includes the wireless PDA 10 communicating with a wireless application server 20 over a wireless network 22. A wireless modem or communication hardware that support commercial wireless data network (i.e. Mobitex, DataTac, GSM, CDPD, CDM, GPRS, W-CDMA) (not shown) is also necessary. There are number of vendors for both the hardware and software which power the foregoing system components.

For example, the advertising architecture of the present invention can support any PDA device running the Palm Operating System (i.e. Pa PalmV, PalmVII, Sony Clie, Kyocera SmartPhone), the Research In Motion's RIM Operating System, and Microsoft's PocketPC Operating System. In addition, this architecture can support any device that can host a Java 2 MicroEdition Virtual Machine or is supported by Qualcomm's Binary Runtime Environment for Wireless (BREW) Technology. It should be noted that the foregoing list is merely exemplary and is not intended to be limiting.

Similarly, a variety of wireless application servers 20 exist on the market today which are capable of supporting the advertising application of the present invention. These servers should support data consisting of content, media, and application logic. The server is generally run on hardware running the Solaris, Linux, Windows NT, or Windows 2000 operating systems. The server must also have a TCP/IP network connection and be accessible from a wireless gateway server. The wireless gateway translates wireless data requests and responses into TCP/IP requests and responses.

In a preferred embodiment of the invention, the wireless application server is the ThinAir Server provided by ThinAir-Apps, Inc., New York, N.Y. Other exemplary servers that may be used in the architecture of the present invention include the Lutris Enyhdra, Nokia WAP Gateway, and Microsoft's Mobile Information Server.

A device is also necessary to support third-party applications via a fully programmable operating system, or a micro-browser supporting the Wireless Markup Language (WML), the Hypertext Markup Language (HTML), the Handheld Device Markup Language (HDML), or Compact HTML (CHTML). The device may optionally support the ability to cache data locally for reference and reuse at a later point.

A wireless data service is also necessary to enable communication between the application server and device. This service is enabled by wireless modem hardware which must be used in conjunction with the device. The modem is usually embedded within the device, or attached to an external piece of hardware.

The wireless PDA system of FIG. 2 also includes an advertising media store 24 on the wireless server 20. This wireless media store 24 stores Advert Bundles to be provided to the PDA cache 18 for display on the user interface screen. The Advert Bundles can be provided to the PDA cache 18 in any way which limits or eliminates the need for high bandwidth wireless data transfer. For example, the PDA cache can be updated by the user exchanging a cache data card on the PDA.

The cache could also be updated by utilizing the user's personal computer as a conduit for the transmission of the data. Updated Advert Bundles can be provided to the user's desktop personal computer so that the PDA would be updated during synchronization of the PDA to the desktop personal computer.

Additionally, the PDA cache could be updated by wireless transactions during "down" cycles or via push mechanisms. While requiring wireless transmission of the Advert Bundles, significantly less bandwidth is required than would be the case if the advertisements were being transmitted for display in real time.

Figure 3:
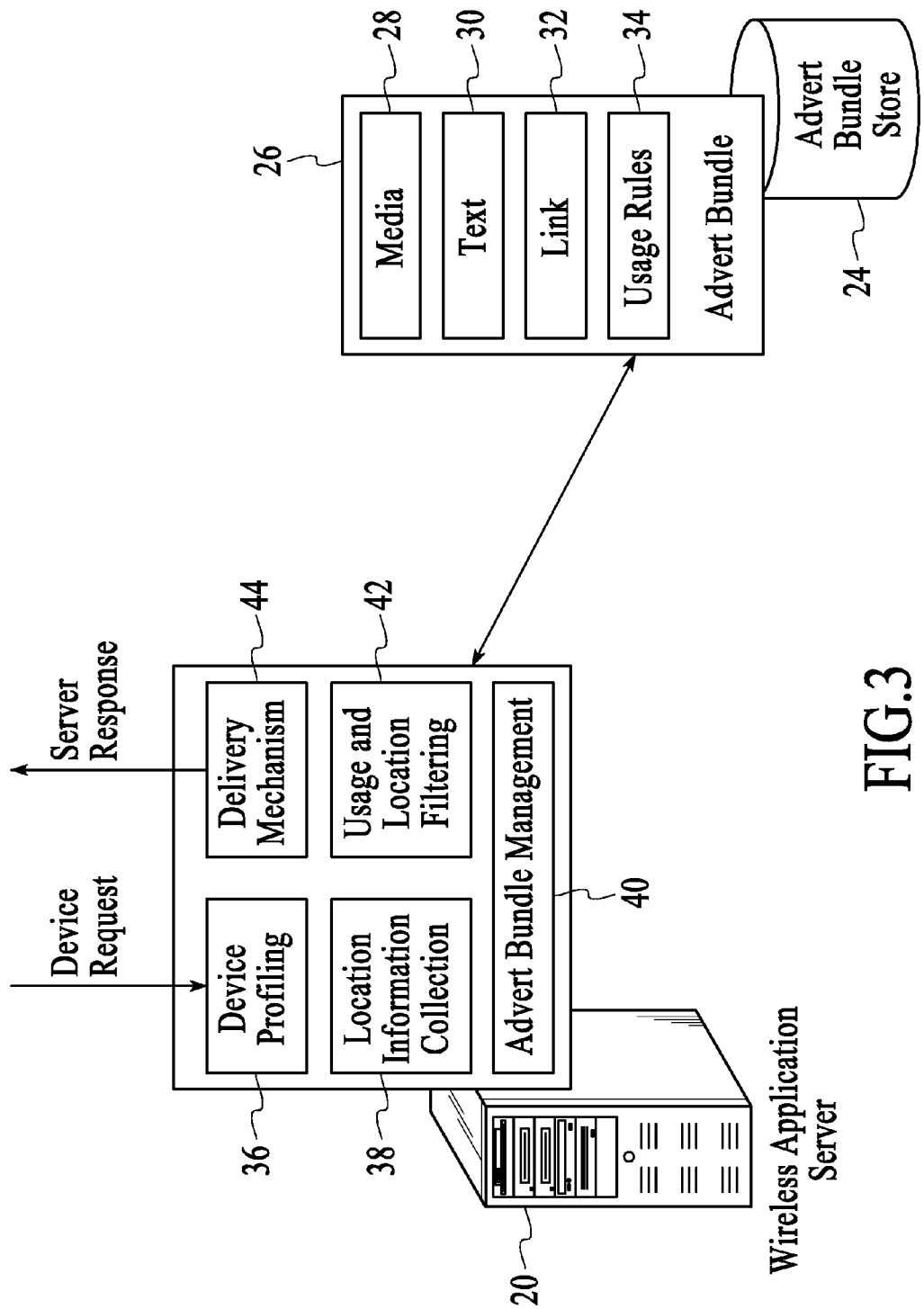
FIG. 3 is an illustration of the advertising data management scheme of a preferred embodiment of the present invention.

An illustration of the Advert Bundle management scheme of the wireless server is depicted in FIG. 3. The advertising media store 24 stores the Advert Bundles 26 for the advertisements of parties interested in providing advertising to user's of the PDA's. The Advert Bundles are used to store advertising data on the user's PDA for use by a variety of applications. Any number of bundles may be stored on the device, being only limited by the amount of storage the device has.

Each Advert Bundle 26 includes the media to be displayed 28. The media to be displayed 28 being a small footprint digital image file specifically sized for the type of PDA or other wireless device on which the advertisement is to be displayed. The Advert Bundle 26 also includes a text only version of the advertisement 30 to be used where no media is supplied or where the device is incapable of displaying the media.

In addition, the Advert Bundle 26 also includes any hypertext links 32 specifying locations where more information about the subject of the advertisement is available. This link 32 can be in the form of an HTTP Uniform Resource Locator (URL), or a pointer to another local application on the mobile device. Further, each Advert Bundle 26 includes usage rules 34 which is the control data determining how often, when, and where to display the advertisement.

It should be readily understood that, through use of the Advert Bundles 26, the data required to be transmitted wirelessly to display advertisements on a wireless device can be significantly reduced or eliminated. It should also be understood that the Advert Bundles, while a logical grouping of information, can be distributed between both the client and server. For instance, the media portion 28 of the bundle 26 may be stored on the user device, while the text 30 and link 32 could be sent each time from the server 20. This allows for greater flexibility and easier management of the Advert Bundles 26.

The wireless devices that the advertising architecture of the present invention is addressing are constrained and limited in their display capabilities. Along with that, the known, shared characteristics of wireless devices tend to vary widely in their actual embodiment. Some examples of these varying characteristics include screen size, bit depth, support for color, input mechanism, e.g., stylus, keyboard, phone pad, voice, and supported data services.

As advertising is focused on delivering an inviting experience to the viewer, these issues must be handled by any advertising scheme involving the display of media on a wireless device. The advertising architecture of the present invention supports identification of devices and metadata about their characteristics. As depicted in FIG. 3, this profiling mechanism can be used to modify the data in an Advert Bundle before delivery to a wireless device.

In operation, a request from a device for an update of the Advert Bundles will be received at the server 20. A profiling operation 36 will then be performed to determine the type of device submitting the request. A location determining operation 38 is also performed to determine the location of the wireless device. Based upon the profiling operation 36, an Advert Bundle Management application 40 will select the Advert Bundles appropriate for the device.

Based upon the location determining operation 38, the Advert Bundles 26 selected by the Advert Bundle Management application 40 may be further filtered to select only those appropriate for the identified location. The Advert Bundles are then delivered 44 to the user device using a delivery mechanism as described above.

Another important variable with wireless devices is which Data Services are supported by the device. For instance, most mobile handsets support the Wireless Application Protocol (WAP), which uses an HTTP "browser" type transport to deliver data. However, they also support the Short Message Service (SMS) for push or instant message-type transactions. This information would be determined during the profiling operation 36 and the Advert Bundles selected by the Advert Bundle Management application 40 would be appropriate for the device.

With respect to the location data, many wireless devices have or will have the capability of determining the current geographical location of the user. Palm, Inc.'s PalmVII and PalmVIIx both allow application developers to determine the current location of the user down to the zip code. It should be understood that the advertising architecture of the present invention does not provide the location data. Instead, this data is provided by the wireless devices and may be different for different devices.

As part of the device profiling capabilities location data can be accessed as available by specific devices. This data can be used to filter which Advert Bundles get delivered to which users. This feature is extremely important for context-based filtering of data including advertisements. For instance, if a Palm user is using an application in Manhattan, advertisements may be targeted to goods or services provided in Manhattan.

Figure 4:
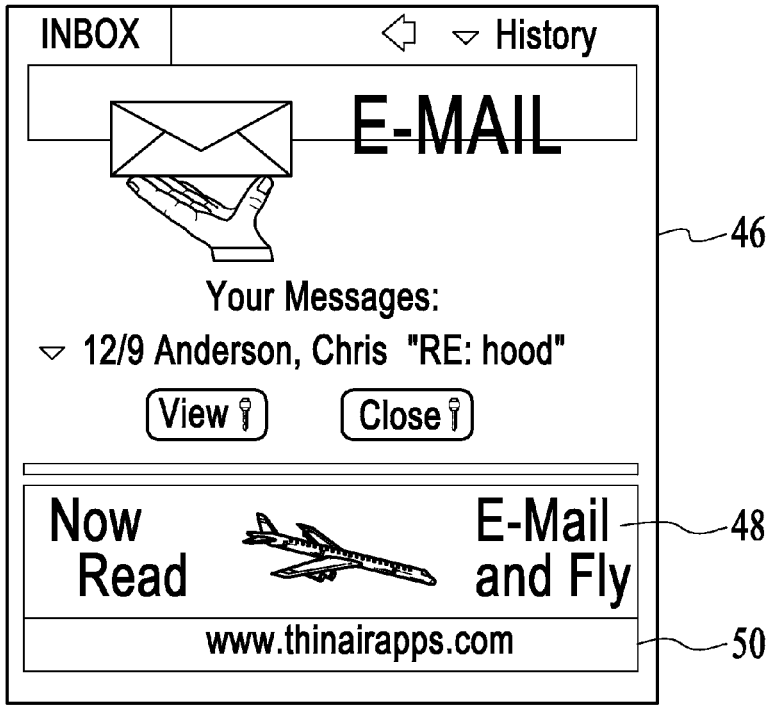
FIG. 4 is a screen shot of a wireless PDA including a text and media advertisement.
Figure 5:
FIG. 5 is a screen shot of a wireless PDA including a text only advertisement.

In FIG. 4 there is shown a typical application of the present invention where, in the screen shot depicted, an e-mail application is displayed in the user interface portion 46 of the PDA. In the advertisement portion a text and media advertisement 48 is displayed along with a hyperlink connection 50 to the advertiser's web page. Advertisements may also be provided in other formats, as shown in FIG. 5 wherein only text is provided in the advertisement 52.

Further, the Advert Bundles can direct that advertisements be displayed in different locations on the user interface screen in different sizes. For example, in the system of the present invention, it is contemplated that advertisements would be displayed in the e-mail inbox header view, at the bottom of each full e-mail message and at the bottom of each e-mail composition screen.

Each time the user navigates to one of these screens, the Advert Bundle changes to a new one. In the presently preferred embodiment, there are a total of five Advert Bundles. The server side of the application controls the Usage Rules 34, controlling which Advert Bundles are displayed when, to which users, and potentially filtering based on the user's current zip code.

In this presently preferred embodiment, the Advert Bundles can be updated by modifying a Palm Query Application database record on the PalmVII device. This record stores the bundles separately from the main application interface, and can be updated over the PalmVII's wireless connection.

User's of wireless devices for such applications as e-mail may be provided with the option of receiving or refusing to receive advertisements. Incentives, such as free e-mail service, etc., may be provided to user's electing to receive the advertisements while user's refusing to receive the advertisements would pay for these services. Once electing to receive advertisements, the timing, selection, and display of the advertisements would be controlled.

Figure 6:
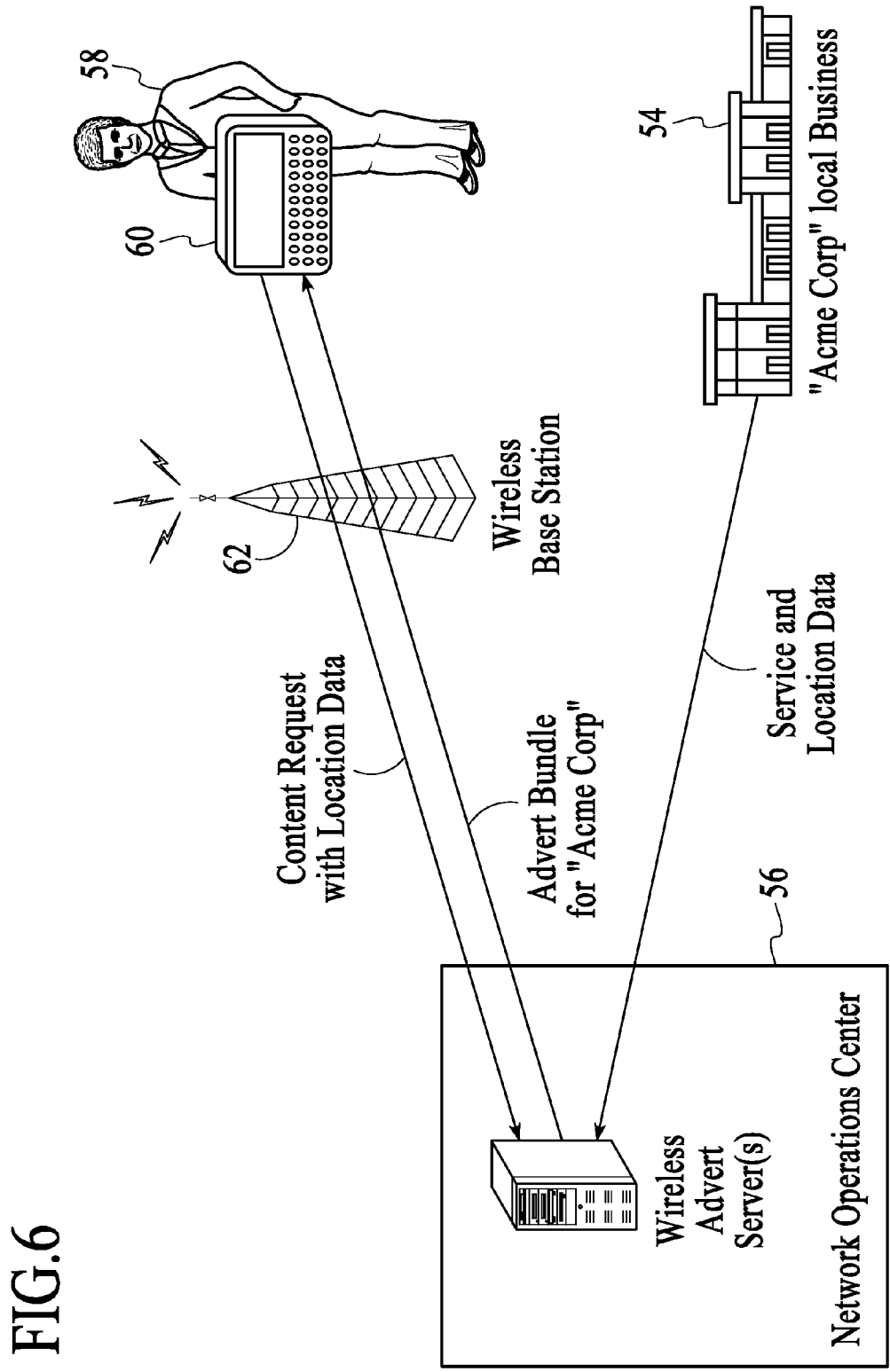
FIG. 6 is an illustration of the operation of a the advertising architecture of a preferred embodiment of the present invention.

As shown if FIG. 6, an advertiser 54 forwards a request to the wireless server provider 56 that an advertisement be created for the advertisers goods or services and be provided to wireless data users 56. In the system depicted, the user 58 is utilizing a text pager 60 which communicates with the wireless server 56 over a suitable communication network 62.

It should be understood that the request for creation of the advertisement does not need to be transmitted over the web to the server provider 56. It is also contemplated that advertisers utilizing the advertising architecture of the present invention will develop their own Advert Bundle to be transmitted to the server provider 56 for ultimate transmission to users 58.

It can be readily understood from the foregoing description that the advertising architecture of the present invention provides a way for media content to be specifically targeted and tailored for each device type, making use of specific capabilities of the devices. The architecture also efficiently utilizes bandwidth by transmitting only essential information over the wireless network to communicate which advertisements to display, when to display them, and geographically where to display them.

The architecture also provides a framework for delivering extra textual information about the advertisement, along with "click-through" hyper linking to both local, on the device applications and remote web-based content.

This architecture moves much of the logic of web-based advertising solutions onto the user device itself. Personal Digital Assistants such as the Palm or PocketPC are more than capable of supporting this type of processing and logic. In the near future, mobile phones will also have this capability through technologies such as Sun's Java 2 MicroEdition (J2ME) and Qualcomm's BREW.

The above description and drawings are only illustrative of preferred embodiments which achieve the objects, features, and advantages of the present invention, and it is not intended that the present invention be limited thereto. Any modification of the present invention which comes within the spirit and scope of the following claims is considered to be part of the present invention.

What is claimed is:

1. A method of delivering advertisement content to a wireless device the method comprising:
   determining a geographic location of the wireless device from wireless data sent from the wireless device;
   determining from a wireless communication with the wireless device a type of the wireless device;
   selecting advertisement data to be transmitted to the wireless device based at least in part on the geographic location of the wireless device and the type of the wireless device; and
   sending the advertisement data to the wireless data in order to enable a processor to generate an advertisement display on the wireless device using the advertisement data.

2. The method of claim 1, wherein sending the advertisement data to the wireless device includes:
   transmitting the advertisement data from a server to a computer that performs a synchronization operation with the wireless device, so that the advertisement data is transferred to the wireless device during the synchronization process.

3. The method of claim 1, wherein sending advertisement data to the wireless device includes sending a selectable link that comprises at least a portion of the advertisement data.

4. The method of claim 1, wherein sending the advertisement data includes configuring the advertisement data according to a display characteristic of the identified type of wireless device.

5. The method of claim 4, wherein configuring the advertisement data includes configuring the advertisement data based on the characteristic selected from a group of characteristics consisting of a screen size of a display of the wireless device, a bit depth of the display supported by the wireless device, and color support for the display of the wireless device.

6. The method of claim 1, further comprising sending instructions to the wireless device to control how often the advertisement is displayed on the wireless device.

7. The method of claim 6, wherein sending the instructions is performed with sending the advertisement data.

8. The method of claim 1, further comprising sending instructions to the wireless device to control a screen location of the advertisement when the advertisement is displayed.

9. A method of managing advertising content in a wireless device, the method comprising:
   determining information about a wireless device from one or more wireless communications performed by the wireless device, said information including geographic location information and information that indicates a type of the wireless device;
   based at least in part on the determined information, selecting a geographic-specific advertisement, formatted to accommodate the type of the wireless device, for delivery to the wireless device; and
   communicating the formatted and geographic-specific advertisement to the wireless device; and
   communicating one or more rules to the wireless device for displaying the formatted and geographic-specific advertisement to the wireless device, wherein the one or more rules determine a timing of display of the formatted and geographic-specific advertisement.

10. The method of claim 9, wherein said information determined from said communication from said wireless device also includes a profile of the device, said profile including the data services supported by said device.

11. The method of claim 10, further comprising configuring the advertisement content according to a display characteristic identified by the profile of the wireless device.

12. The method of claim 9, wherein said advertisement is in form of an advertisement image or an advertisement media.

13. The method of claim 9, further comprising:
   generating an advertising image as part of said advertisement content;
   displaying, on the wireless device, the advertisement image on a first portion of a display of the wireless device; and
   displaying another image generated from execution of an other application on a second portion of the display of the wireless device, wherein the first portion is spatially apart from the second portion;
   wherein displaying the advertisement image includes selecting a region of the display that is to correspond to the first portion on which the advertisement image is displayed.

14. The method of claim 9, further comprising: controlling an aspect of the advertisement content as presented on a display of the wireless device, including a selected screen location of the advertisement content, the selected screen location being selected from one or more other locations on which the advertisement content is presentable on the display of the wireless device.

15. The method claim 9, wherein communicating the one or more rules includes communicating one or more rules that control how often the formatted and geographic-specific advertisement is displayed on the wireless device.

\* \* \* \* \*

UNITED STATES PATENT AND TRADEMARK OFFICE
CERTIFICATE OF CORRECTION

PATENT NO. : 8,458,286 B2
APPLICATION NO. : 09/794082
DATED : June 4, 2013
INVENTOR(S) : Nathanial X. Freitas et al.

It is certified that error appears in the above-identified patent and that said Letters Patent is hereby corrected as shown below:

In the Claims

In column 8, line 33, in Claim 15, delete "method" and insert -- method of --, therefor.

Signed and Sealed this
Seventeenth Day of September, 2013

Teresa Stanek Rea
*Deputy Director of the United States Patent and Trademark Office*